Patented Oct. 27, 1931

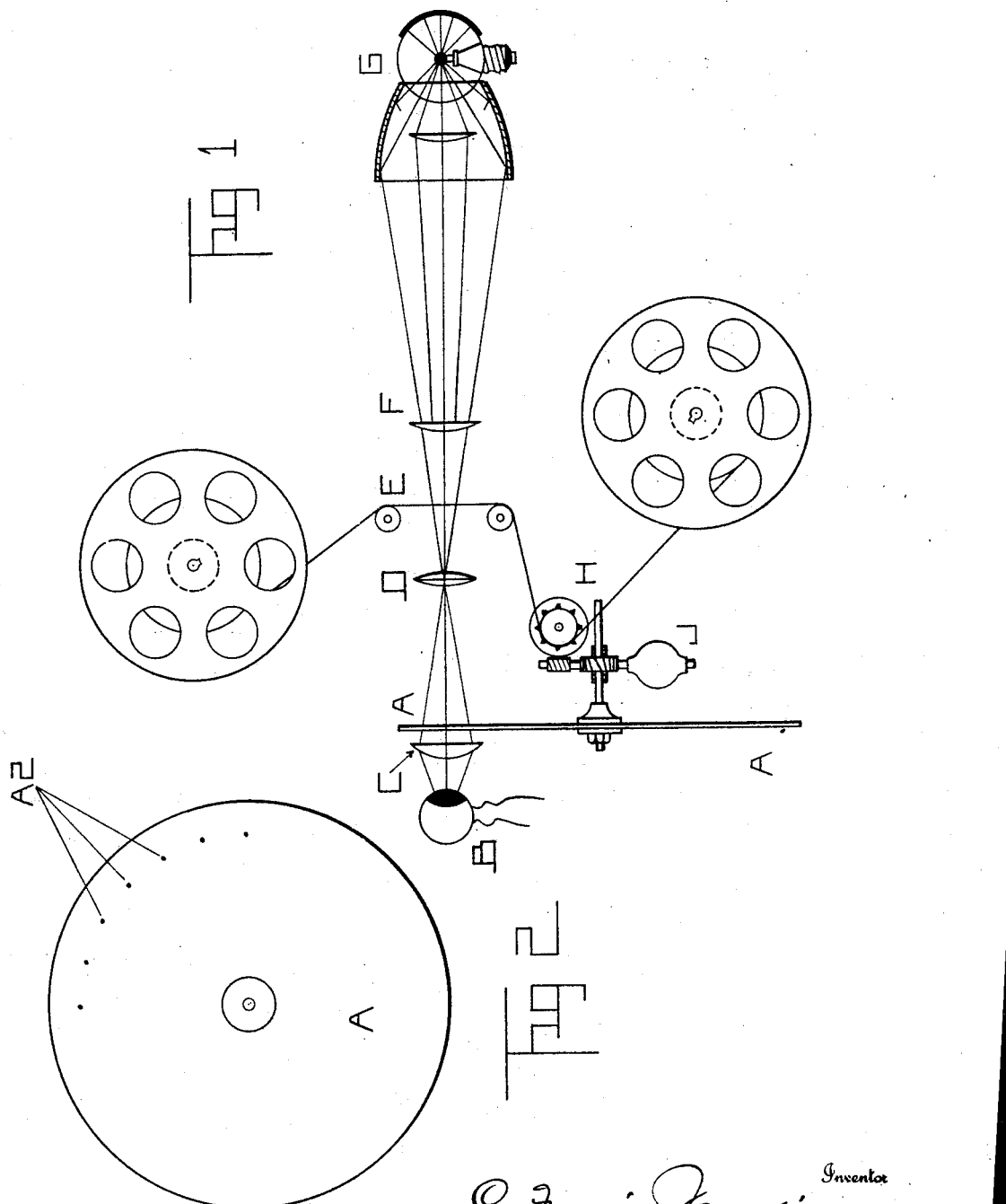

1,828,867

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

SCANNING DEVICE

Application filed May 2, 1929. Serial No. 359,846.

This invention relates to radiomovies transmitters, and has for its principal object an arrangement of elements which insures better broadcast signals and more uniform image-current translation.

In the use of a disc scanner which scans the film picture frames directly, the film must lie so very close to the film, with apertures in the disc so small for good detail of each three-quarter inch film frame, that two serious difficulties are immediately encountered; i. e., (1) diffraction blurs the sharpness of the scanning; and the necessary proximity of the disc to the film soon fills up the scanning apertures, so that the translation of picture-image into electrical current lacks sharpness, and the picture reception in receiving radiovisors is poor.

By enlarging the standard film image by projection, i. e., the subject of this application, (1) the apertures in the scanning disc are larger, so that diffraction bears a lesser relation to the aperture area; (2) the disc lies in a free air, removed from the proximity of the film, and, therefore, does not clog up with dirt and/or oil; and (3) the apertures may be made square increasing the light efficiency.

With these and other objects in view, the invention consists of the novel combination of parts herein described, illustrated in the drawings, and particularly pointed out in the claims.

In the drawings, Figure 1 is a diagrammatic illustration of the mechanism, and Figure 2 a plan view of the scanning disc.

In the drawings, A is the scanning disc, having a series of circularly arranged scanning apertures A2 therein, only a portion of the whole of which are shown. B is a light-sensitive cell; C a lens for directing the diverging-paths (of the light beam) into the cell. D is a projecting lens for enlarging the film E picture-frames by projection to the focal plane in which the scanning disc rotates. F is an auxiliary lens which may or may not be found advantageous to use. G is a light-source and its light-concentrating devices. H is the geared film-sprocket and scanning-disc assembly, driven by the motor J.

The film is in constant movement, and the disc rotates at such revolutions-per-minute as will pass the desired number of scanning apertures across each film picture-frame, as, for example, a 48-line per-frame scanning.

In operation, the light G having been turned on, the motor is started. The motor rotates the scanning disc and also draws the film E down across the light beam; and the lens D projects the film picture-frames to the forward focal plane, which is the plane in which the scanning disc A rotates. The image light passing through the scanning apertures is directed by lens C onto the light-sensitive cell B.

The general principles involved are so well known to those skilled in this art, that detailed description is probably not required. The invention consists of the new location of the elements to produce a result far superior and more dependable than any other arrangement of like parts heretofore employed by applicant.

The surprising improvement in the quality of the picture resulting from the new location of the elements of the system comes about from the increased latitude of scanning aperture shape and area; and apertures which always stay free of fouling accumulations. For the scanner rotates in free air, that is, does not rub against the picture film and fill up the apertures with dirt, or even lie close enough to gather oil.

Also the projected image, in the arrangement of this application, is large enough to permit the employment of square apertures in the scanning disc, obviously an advantage of a third increase in light falling on the cell therethrough.

In a scanning disc where the individual apertures are but one-two thousand three hundred and fourth part of the three-quarter inch square picture on a motion picture film, the apertures are so small that, even if it were possible to make them square, diffraction would make them appear round.

Diffraction is a factor of the boundary edge of the aperture, while the light falling on the cell is a factor of the square of the diameter; it will readily be seen, therefore, that enlarging the aperture increases the advantages of direct light much faster than the disadvantages of diffraction loss.

Not only is this true, but the location of the sensitive cell close beyond the scanning disc, with the picture image directed onto the disc by a lens, the cell is effected by both the directed light and the diffracted light, obviously a marked gain in cell activity.

While the percentage of gain in this system over the old system has not yet been measured, the actual gain results in a great improvement in the received picture, increasing the black of the blacks in the picture and the sharpness of the image.

What I claim, is—

1. In combination a light source, a motion picture film, a scanning disc having a series of square scanning openings, means for projecting a magnified image of each picture frame on the scanning field of said disc, the openings in said disc being enlarged in proportion to the magnification of said image.

2. In combination a motion picture film, a scanning disc having a series of enlarged square perforations, said disc having a scanning field a plurality of times as large as a motion picture frame, and means for projecting upon said disc an image of the picture frames of substantially the same size as the scanning field of said disc.

3. In combination means for producing a magnified image of a subject to be scanned, and means for scanning said magnified image including a perforated disc having square perforations enlarged in proportion to the said magnification.

4. In a scanning system of the type wherein a subject is scanned in successive areas of elemental size, the method which comprises projecting on the plane of the scanner an enlarged image of the subject, the openings in said scanner being enlarged in proportion to the magnification of the image, optically collecting both the directed and diffracted light passing through the scanner, and translating said collected light into corresponding photo-electric currents.

In testimony whereof I have affixed my signature.

CHARLES FRANCIS JENKINS.